(12) United States Patent
Simske et al.

(10) Patent No.: US 7,424,672 B2
(45) Date of Patent: Sep. 9, 2008

(54) SYSTEM AND METHOD OF SPECIFYING IMAGE DOCUMENT LAYOUT DEFINITION

(75) Inventors: Steven J. Simske, Fort Collins, CO (US); Margaret Sturgill, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 392 days.

(21) Appl. No.: 10/679,154

(22) Filed: Oct. 3, 2003

(65) Prior Publication Data

US 2005/0076295 A1    Apr. 7, 2005

(51) Int. Cl.
*G06F 17/00* (2006.01)

(52) U.S. Cl. .................. 715/243; 715/247; 715/248; 715/253

(58) Field of Classification Search .............. 715/517, 715/501.1, 526, 205, 243–25, 273; 382/173, 382/305, 176, 180, 217; 358/403
See application file for complete search history.

(56) References Cited

U.S. PATENT DOCUMENTS

| | | | | | |
|---|---|---|---|---|---|
| 4,823,395 | A | * | 4/1989 | Chikauchi | 382/199 |
| 5,123,062 | A | * | 6/1992 | Sangu | 382/174 |
| 5,159,667 | A | * | 10/1992 | Borrey et al. | 715/500 |
| 5,296,939 | A | * | 3/1994 | Suzuki | 358/453 |
| 5,317,680 | A | | 5/1994 | Ditter, Jr. | |
| 5,416,849 | A | * | 5/1995 | Huang | 382/173 |
| 5,465,304 | A | * | 11/1995 | Cullen et al. | 382/176 |
| 5,555,362 | A | * | 9/1996 | Yamashita et al. | 715/517 |
| 5,592,576 | A | * | 1/1997 | Hayashi | 382/318 |
| 5,596,655 | A | | 1/1997 | Lopez | |
| 5,682,540 | A | * | 10/1997 | Klotz et al. | 715/505 |
| 5,764,866 | A | * | 6/1998 | Maniwa | 358/1.15 |
| 5,767,978 | A | * | 6/1998 | Revankar et al. | 358/296 |
| 5,768,333 | A | * | 6/1998 | Abdel-Mottaleb | 378/37 |
| 5,815,595 | A | * | 9/1998 | Gugler | 382/173 |
| 5,818,976 | A | * | 10/1998 | Pasco et al. | 382/289 |
| 5,822,454 | A | * | 10/1998 | Rangarajan | 382/180 |
| 5,848,184 | A | * | 12/1998 | Taylor et al. | 382/173 |
| 5,887,082 | A | * | 3/1999 | Mitsunaga et al. | 382/199 |
| 5,893,127 | A | * | 4/1999 | Tyan et al. | 715/513 |
| 5,901,253 | A | * | 5/1999 | Tretter | 382/289 |
| 5,978,519 | A | * | 11/1999 | Bollman et al. | 382/282 |

(Continued)

OTHER PUBLICATIONS

Cattoni et al.,"Geometric Layout Analysis Techniques for Document Image Understanding: a Review", Jan. 1998, ITC-IRST, 68 pages.*

(Continued)

*Primary Examiner*—Doug Hutton
*Assistant Examiner*—James H Blackwell

(57) ABSTRACT

A system and method of processing an image comprises receiving a definition of at least one region in the image, where the region definition has a location specification and a type specification. The method further comprises displaying the boundaries of the at least one defined region according to its type specification, receiving a definition of a visible area in the image, the visible area definition having a specification of margins around the image, generating an image layout definition comprising the region definition and the visible area definition, and saving the image layout definition. The image layout definition may also be used as a template to conform image documents to a specified layout.

38 Claims, 6 Drawing Sheets

U.S. PATENT DOCUMENTS

| | | | | |
|---|---|---|---|---|
| 5,999,664 | A * | 12/1999 | Mahoney et al. | 382/305 |
| 6,047,251 | A * | 4/2000 | Pon et al. | 704/1 |
| 6,078,697 | A * | 6/2000 | Ng | 382/275 |
| 6,151,426 | A | 11/2000 | Lee et al. | |
| 6,163,623 | A * | 12/2000 | Ohta | 382/176 |
| 6,252,677 | B1 * | 6/2001 | Hawes et al. | 358/1.9 |
| 6,252,985 | B1 * | 6/2001 | Mitsunaga et al. | 382/199 |
| 6,263,122 | B1 * | 7/2001 | Simske et al. | 382/311 |
| 6,377,703 | B1 * | 4/2002 | Yeung | 382/173 |
| 6,385,351 | B1 * | 5/2002 | Simske et al. | 382/312 |
| 6,400,845 | B1 * | 6/2002 | Volino | 382/176 |
| 6,446,099 | B1 * | 9/2002 | Peairs | 715/517 |
| 6,459,499 | B1 * | 10/2002 | Tomat | 358/1.15 |
| 6,466,954 | B1 * | 10/2002 | Kurosawa et al. | 715/520 |
| 6,594,030 | B1 * | 7/2003 | Ahlstrom et al. | 358/1.15 |
| 6,674,901 | B1 * | 1/2004 | Simske et al. | 382/180 |
| 6,683,984 | B1 * | 1/2004 | Simske et al. | 382/190 |
| 6,735,740 | B2 * | 5/2004 | Sakai et al. | 715/526 |
| 6,751,780 | B1 * | 6/2004 | Neff et al. | 715/530 |
| 6,768,816 | B2 * | 7/2004 | Hall et al. | 382/229 |
| 6,778,703 | B1 * | 8/2004 | Zlotnick | 382/218 |
| 6,865,576 | B1 * | 3/2005 | Gong et al. | 707/100 |
| 6,957,384 | B2 * | 10/2005 | Jeffery et al. | 715/501.1 |
| 7,054,509 | B2 * | 5/2006 | Rom | 382/306 |
| 2002/0152245 | A1 * | 10/2002 | McCaskey et al. | 707/530 |
| 2003/0103071 | A1 * | 6/2003 | Lusen et al. | 345/705 |
| 2004/0013302 | A1 * | 1/2004 | Ma et al. | 382/209 |

OTHER PUBLICATIONS

Liang, J. et al.,"Document layout structure extraction using bounding boxes of different entities", in: Proc. 3rd IEEE Workshop on Applic. of Computer Vision (Sarasota, FL, 1996), pp. 278-283.*

Baird H.,"Model-Directed Document Image Analysis", Apr. 14-16, 1999, Xerox PARC, 8 pages.*

Esposito F. et al.,"A Knowledge-Based Approach to the Layout Analysis", 1995, IEEE, pp. 466-470.*

T. Kanungo et al.,"Trueviz: a groundtruth/metadata editing and visualizing toolkit for OCR", Jan. 2002, In Proc. of SPIE Conference on Document Recognition and Retrieval, 12 pages.*

Yacoub S. eet al.,"PerfectDoc: A Ground Truthing Environment for Complex Documents", 2005, IEEE, 5 pages.*

Yanikoglu, B. et al.,"Pink Panther: A COmplete Environment for Ground-Truthing and Benchmarking DOcument Page Segmentation", in Pattern Recognition, vol. 31, No. 9, pp. 1191-1204, 1996.*

Zi. G et al.,"Document Image Ground Truth Generation From Electronic Text", IEEE, 2004, 4 pages.*

Wang Y. et al.,"Automatic Table Ground Truth Generation and A Background-analysis-based Table Structure Extraction Method", 2001, IEEE, pp. 528-532.*

Rogers, R.P. et al.,"Semiautomatic production of highly accurate word bounding box ground truth. In Document☐☐Analysis Systems", 1996, (DAS'96). pp. 375-386.*

Hobby, J.,"Matching DOcument Images With Ground Truth", IJDAR, 1998, pp. 52-61.*

Altamura et al, "Transforming paper documents into XML format with Wisdom+ +" [online], Nov. 7, 2000, International Journal on Document Analysis and Recognition. Available from http://www.di.uniba.it/ · malerba/publications/ijdar.pdf[Accessed Sep. 11, 2004] (pp. 1-17).

Ford et al, "Ground truth data for document image analysis" [online], Mar. 24, 2003, Communications Engineering Branch; Available from: http://archive.nlm.nih.gov/pubs/ford/groundTruthData/gtd.php [Accessed Sep. 11, 2004] (pp. 1-10).

Klink et al, "Document Structure Analysis Based on Layout and Textual Features" [online], 2000 (see http://dbis.uni-trier.de/Mitarbeiter/klink_flies/www/Publikationen_en.html). Available from: http://dbis.uni-trier.de/Mitarbeiter/klink_files/www/Postscript/DAS2000-ReviewVersion.pdf [Acc'd Sep. 11, 2004] (16 pages).

UK Search Report dated Nov. 18, 2004 (4 pages).

Kittler, Josef, et al., "On Combining Classifiers," Institute of Electrical and Electronic Engineers Transactions on Pattern Analysis and Machine Intelligence, vol. 20, No. 3, Mar. 1998, pp. 226-239.

Jain, Anil K., "Document Representation and Its Application to Page Decomposition," Institute of Electrical and Electronic Engineers Transactions on Pattern Analysis and Machine Intelligence, vol. 20, No. 3, Mar. 1998, pp. 294-308.

World Wide Web, http://documents.cfar.umd.edu/resources/source/ppanther/gkpr.html, "GroundsKeeper," Greg Arzoomanian, et al., printed on Apr. 29, 2003, 1 page.

World Wide Web, http://documents.cfar.umd.edu/resources/source/ppanther/rdiff.html, "RDIFF—Region Description Information File Format," printed on Apr. 29, 2003, 1 page.

World Wide Web, http://documents.cfar.umd.edu/resources/source/ppanther/gkpr_doc.html, "GroundsKeeper," printed on Apr. 29, 2003, 6 pages.

World Wide Web, http://documents.cfar.umd.edu/resources/source/ppanther/gkpr_snapshot.html, "GroundsKeeper snapshot," printed on Apr. 29, 2003, 1 page.

World Wide Web, http://h20015.www2.hp.com/en/document.jhtml?lc= en&docName= bps03642, "HP ScanJet 5300C Series Scanners—Automatically Detecting Regions Using PrecisionScan Software," printed on Jun. 10, 2003, 3 pages.

World Wide Web, http://h20015.www2.hp.com/en/document.jhtml?lc= en&docName= bps02468, "HP ScanJet 5100C Scanner Family—PrecisionScan, Scanning a Black-and-White Drawing or Logo," printed on Jun. 10, 2003, 3 pages.

* cited by examiner

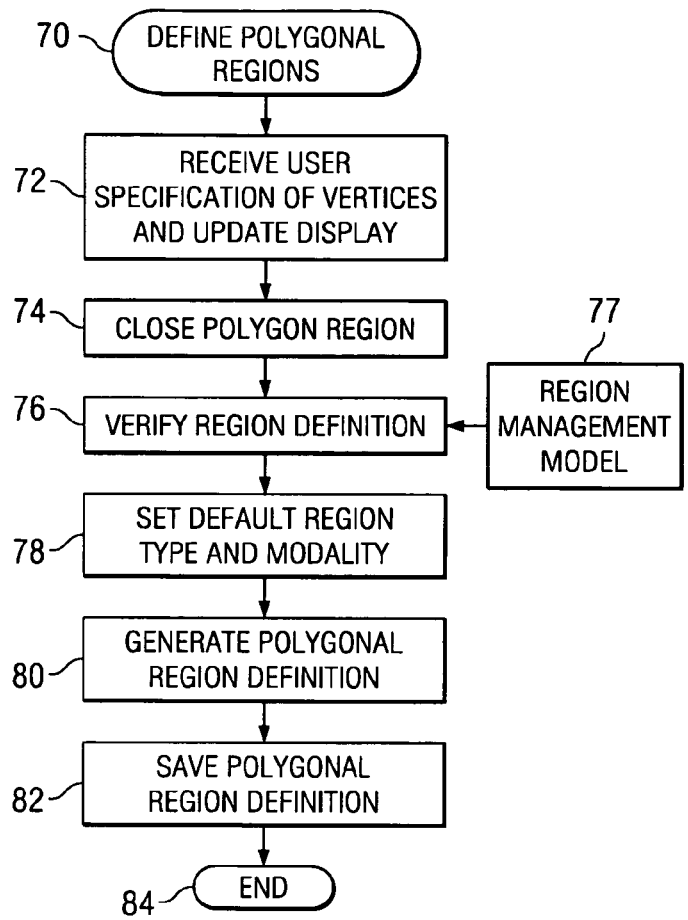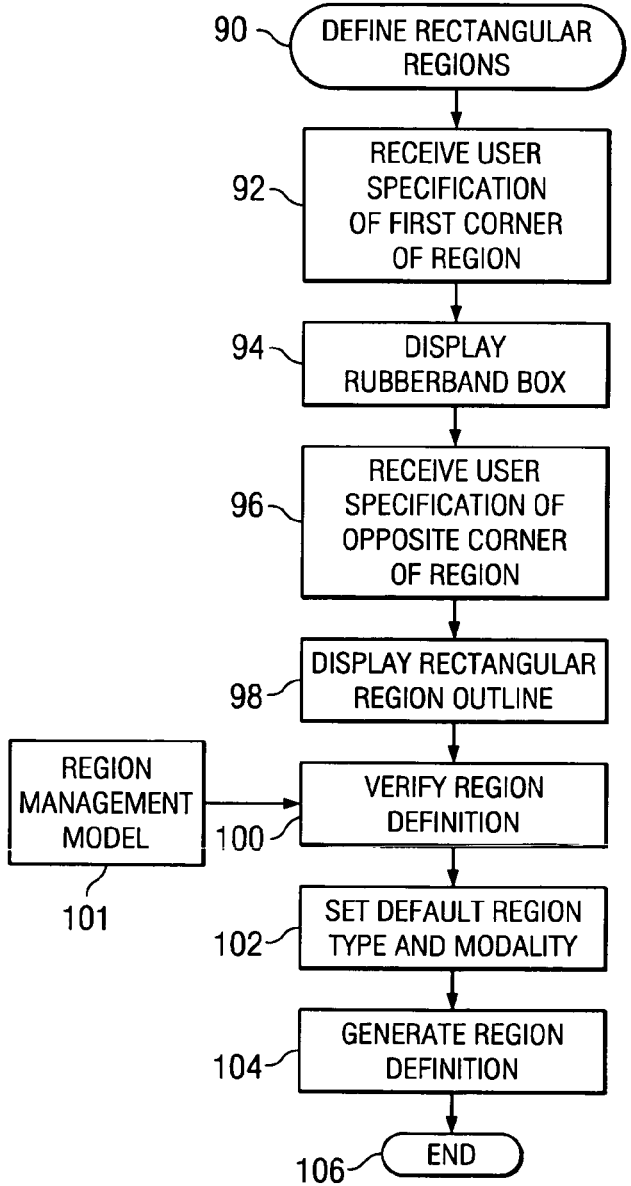

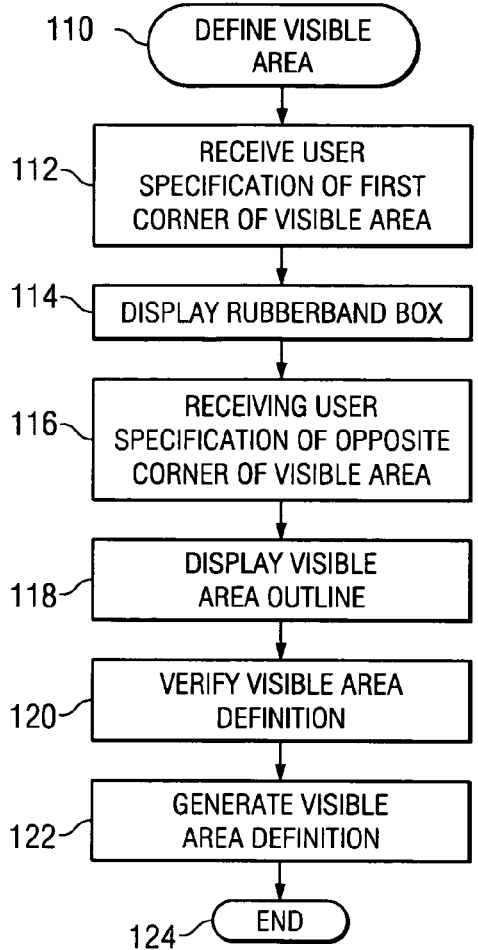
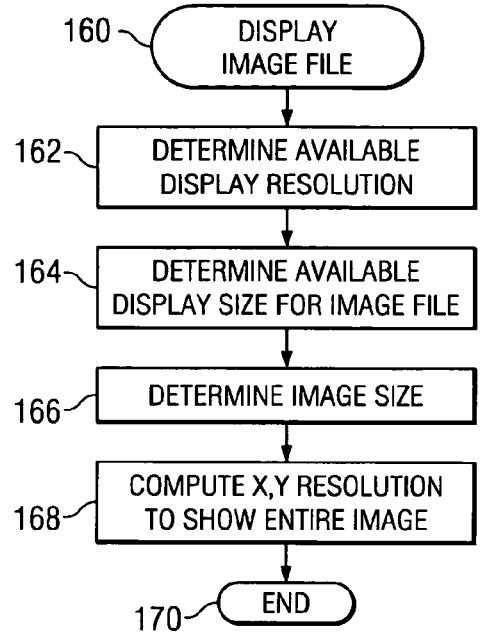
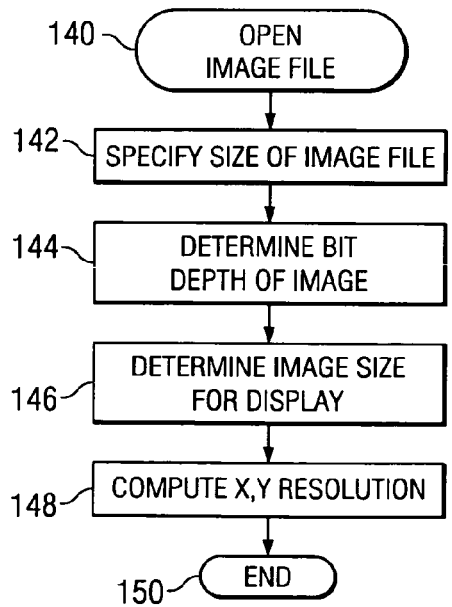
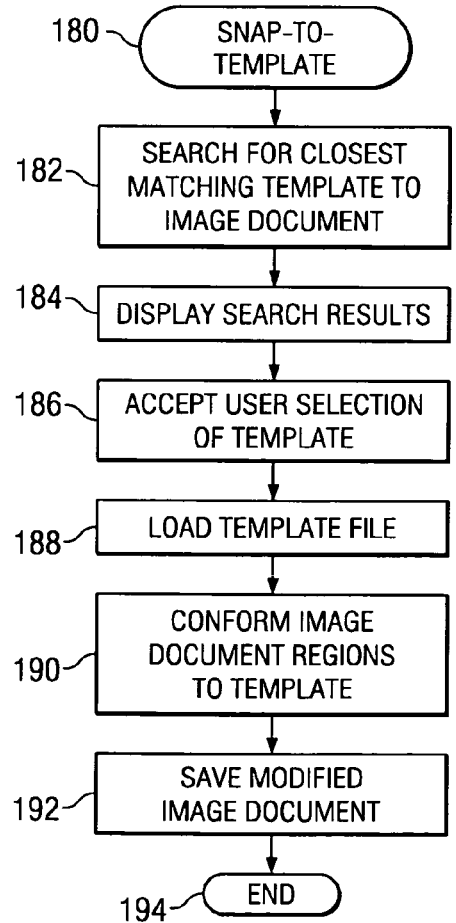

SYSTEM AND METHOD OF SPECIFYING IMAGE DOCUMENT LAYOUT DEFINITION

TECHNICAL FIELD OF THE INVENTION

The present invention relates generally to the field of computers and computer applications, and in particular to a system and method of specifying document layout definition.

BACKGROUND OF THE INVENTION

Computers are increasingly used to handle and process documents, including documents that are composites of text, photographs, drawings, and graphic layout elements. Forms, templates, specialized scanning adapters, and specific re-purposing applications all require a very high degree of accuracy in the layout definition of these layout elements. such very accurate layout definition of a digital document is commonly termed ground truth. The ground truth definition of a document should specify the type, location, size, resolution, and/or special treatment of these layout elements. Existing systems and methods require the user to be very hands-on in every step of the ground truth process. Further, existing systems and methods do not provide an output that is applicable to other image processing applications such as print-on-demand, document re-purposing, document classification and clustering, etc.

SUMMARY OF THE INVENTION

In accordance with an embodiment of the present invention, a method of processing an image comprises receiving a definition of at least one region in the image, where the region definition has a location specification and a type specification. The method further comprises displaying the boundaries of the at least one defined region according to its type specification, receiving a definition of a visible area in the image, the visible area definition having a specification of margins around the image, generating an image layout definition comprising the region definition and the visible area definition, and saving the image layout definition.

In accordance with yet another embodiment of the invention, a method of processing an image comprises determining a definition of at least one region in the image, the region definition having a location specification and a type specification. The method further comprises generating an image layout definition comprising the region definition, searching for an image layout definition template that best matches the generated image layout definition, and conforming the generated image layout definition to the best-matched image layout definition template.

In accordance with yet another embodiment of the invention, a system for processing an image comprises a graphical user interface operable to display the image and receive a definition of at least one region in the image, the region definition having a location specification and a type specification, the graphical user interface further operable to display the boundaries of the at least one defined region according to its type specification. The system further comprises a processor generating an image layout definition comprising the region definition.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is a flowchart of a polygonal region definition process according to an embodiment of the present invention;

FIG. 4 is a flowchart of a rectangular region definition process according to an embodiment of the present invention;

FIG. 5 is a flowchart of a visible area definition process according to an embodiment of the present invention;

FIG. 6 is a flowchart of an open image file process according to an embodiment of the present invention;

FIG. 7 is a flowchart of a display image file process according to of the present invention;

FIG. 8 is a flowchart of a snap-to-template process according to an the present invention;

DETAILED DESCRIPTION OF THE DRAWINGS

The preferred embodiment of the present invention and its advantages are best understood by referring to FIGS. 1 through 11 of the drawings, like numerals being used for like and corresponding parts of the various drawings.

Figure 1:
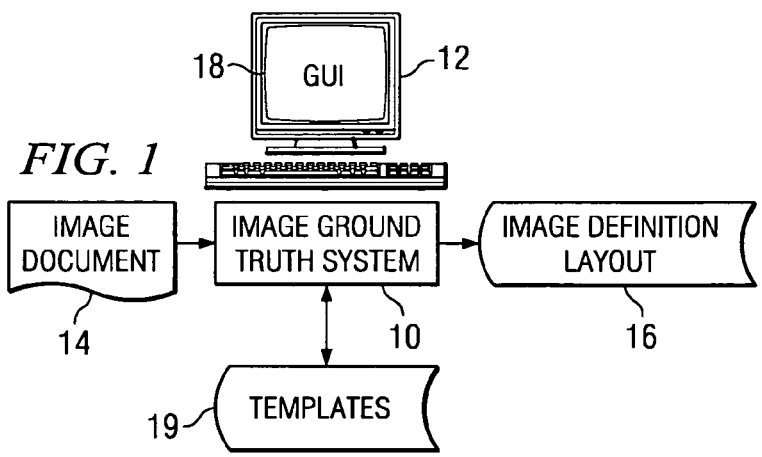
FIG. 1 is a simplified block diagram of an embodiment of a system and method of specifying image layout definition or ground truthing according to the present invention.

FIG. 1 is a simplified block diagram of an embodiment of a system and method of specifying image layout definition 10 according to the present invention. Image ground truth is another common term used to refer to a highly accurate specification of an image document. The image document layout definition may include a number of specifications such as region segmentation, region classification, region clustering, region layout, and region modality. Region segmentation refers to the actual boundaries or outline of a region. Region classification refers to what type of data is in the region, such as text, drawing, photograph, etc. Region classification may be used for clustering, such as clustering lines of text into columns. Region layout is the specification of the relative and absolute physical location of the regions in the image document. Region modality refers to the treatment of the region as a black-and-white, gray scale, or color layout element, which also specifies the bit depth of the region. The term "layout definition" will be used to refer to a collective specification of the regions in an image document. A high degree of accuracy in the layout definition is often required in processing image documents such as re-purposing documents, providing document templates, specialized scanning, creating document templates, and other processes.

Figure 10:
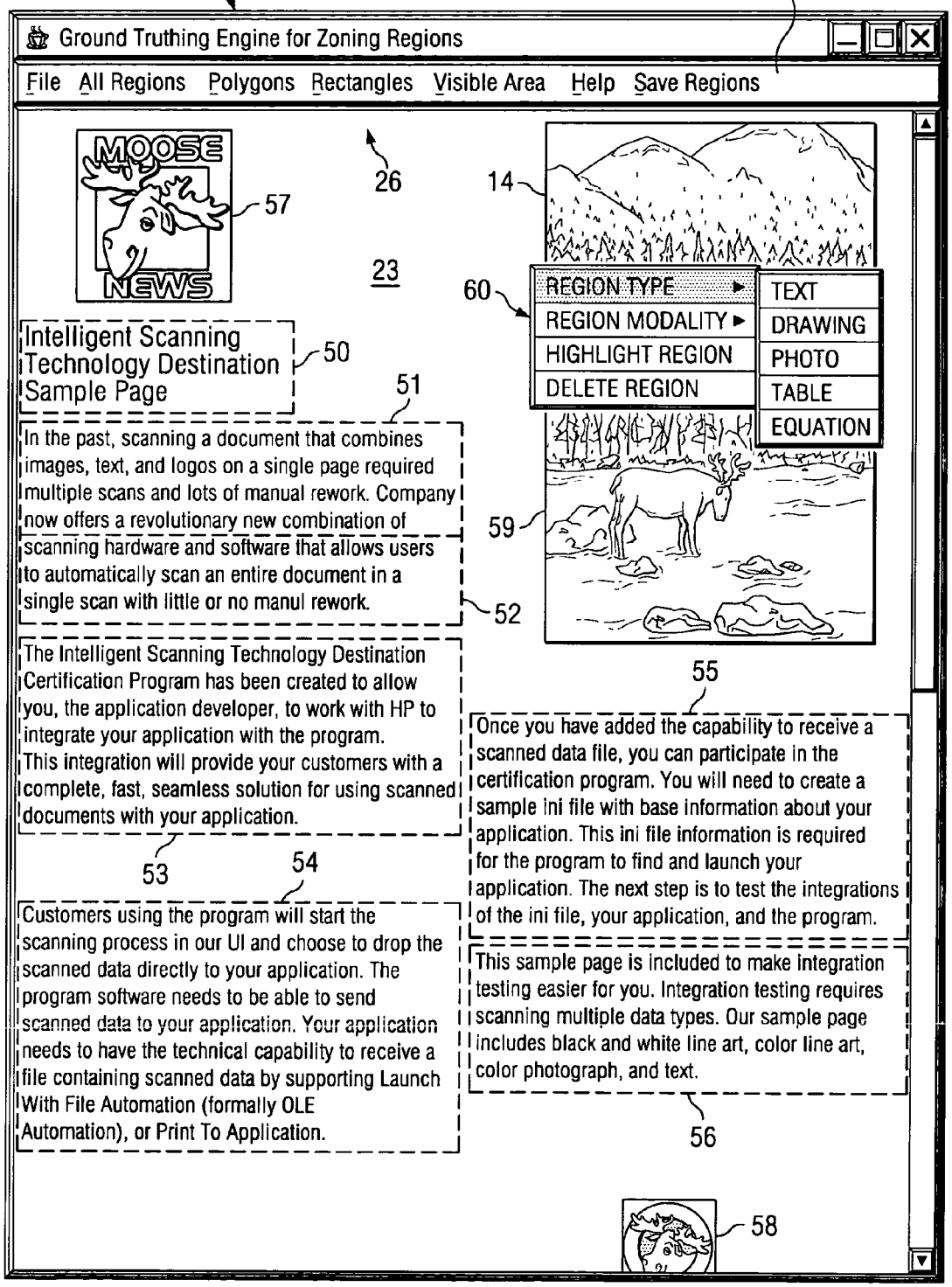
FIG. 10 is an exemplary image document used to illustrate the of the system and method of specifying image layout definition according to of the present invention.

According to an embodiment of image ground truth system 10 operating on a computer platform 12, an image document 14 is provided as input thereto. Computer platform 12 may be any device with a display and a processor. Computer platform 12 may be a portable device or a desktop device and typically comprise a pointing device such as a mouse, touch pad, touch screen, or a writing stylus. Image document 14 is preferably a scanned image of a document in a media file type such as Tag(ged) Image File Format (.TIF), Bit Map (.BMP), Graphic Interchange Format (.GIF), Portable Document Format (.PDF), Joint Photographic Experts Group (.JPEG), etc. or an electronic document in a word processing format such as WORD (.DOC), Hypertext Markup Language (HTML), or another suitable document type. Image ground truth system 10 is operable to automatically analyze document 14 and detect zones in which the document layout elements are present. The document layout elements may include text, graphics, photographs, drawings, and other visible components in the document. Alternatively, system 10 permits the user to specify, using a graphic user interface 18, the various regions occupied by these layout elements. system 10 is operable to output a specification of the image document layout definition 16 in a specified format such as eXtensible Markup Language (XML). system 10 may also output the image document layout definition as a layout template to a template database 19. Template database 19 is a repository for templates that define the layout of image documents. A template comprises a definition of the region type, modality and other properties, visible area, and other specifications of the image document. Using predefined image document templates, new image documents can be quickly put together with new text, photograph, and graphic layout elements. Furthermore, predefined templates may be used to conform image documents to correct inadvertent shifts during document scanning, for example, so that they follow a predefined format. An example of this process is shown in FIG. 10 and described in more detail below.

Image layout definition 16 can serve as input to a variety of systems and applications. For example, image layout definition 16 may be used for document comparison and clustering/classification purposes. Further, image layout definition 16 may be used as a template for processing information. For example, image layout definition 16 may define a template with six photographic regions arranged in a certain layout. This template may be used to arrange and layout photographs in a folder, for example. Image layout definition 16 may be easily compared with other templates or layout definition files to find the most suitable arrangement or layout of the photographs. The use of image layout definition 16 as a template also enables scanned document images that may have been slightly skewed or shifted to be corrected according to the layout specification in the template. In addition, image layout definition 16 may be used as input to a print-on-demand (POD) system that uses it to proof the layout of the documents as a measure for quality assurance. Image layout definition 16 may also be used to ensure proper rendering of a complex scanned document.

Figure 2:
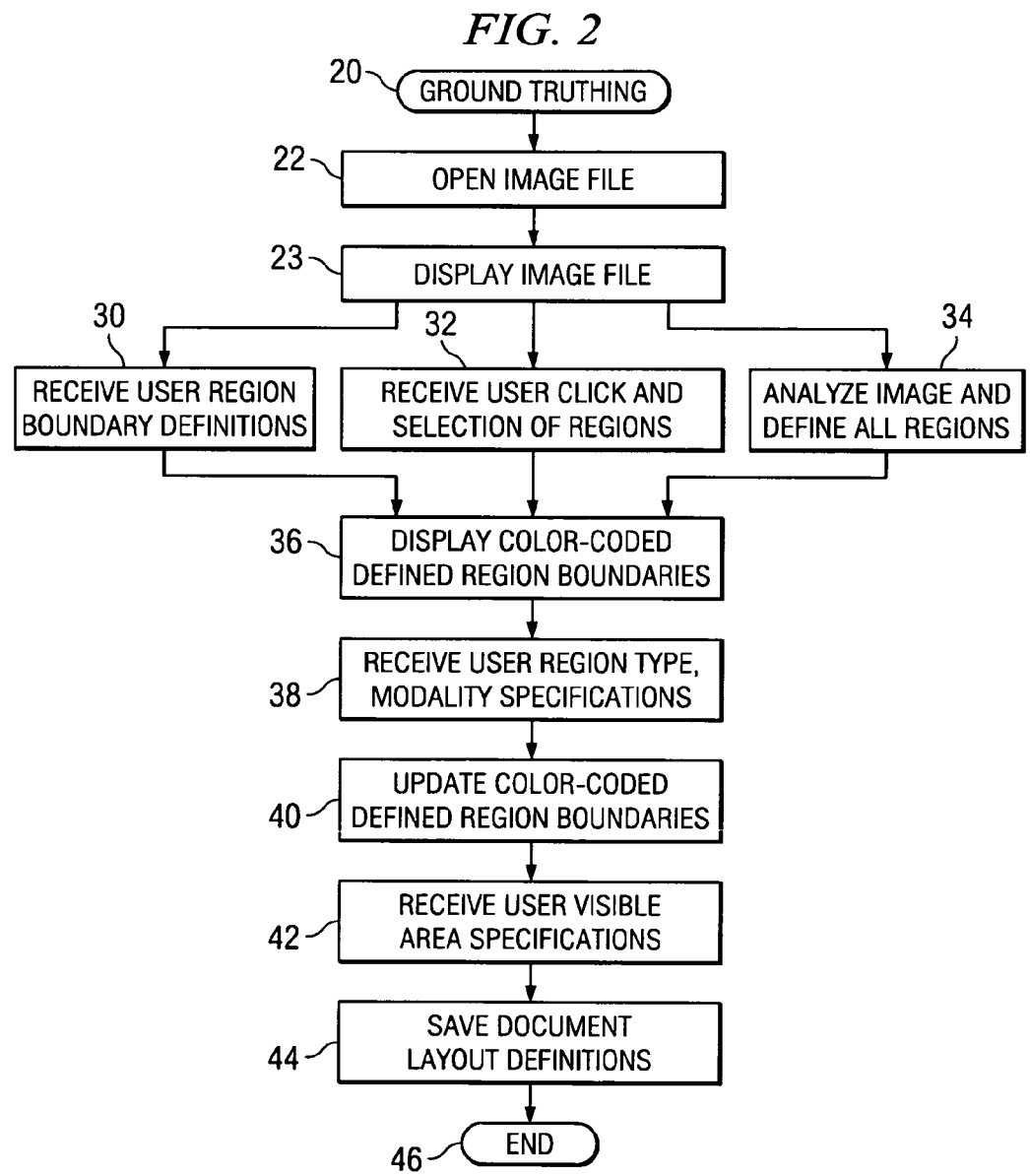
FIG. 2 is a flowchart of an embodiment of a method of specifying image layout definition or ground truthing according to the present invention.
Figure 9:
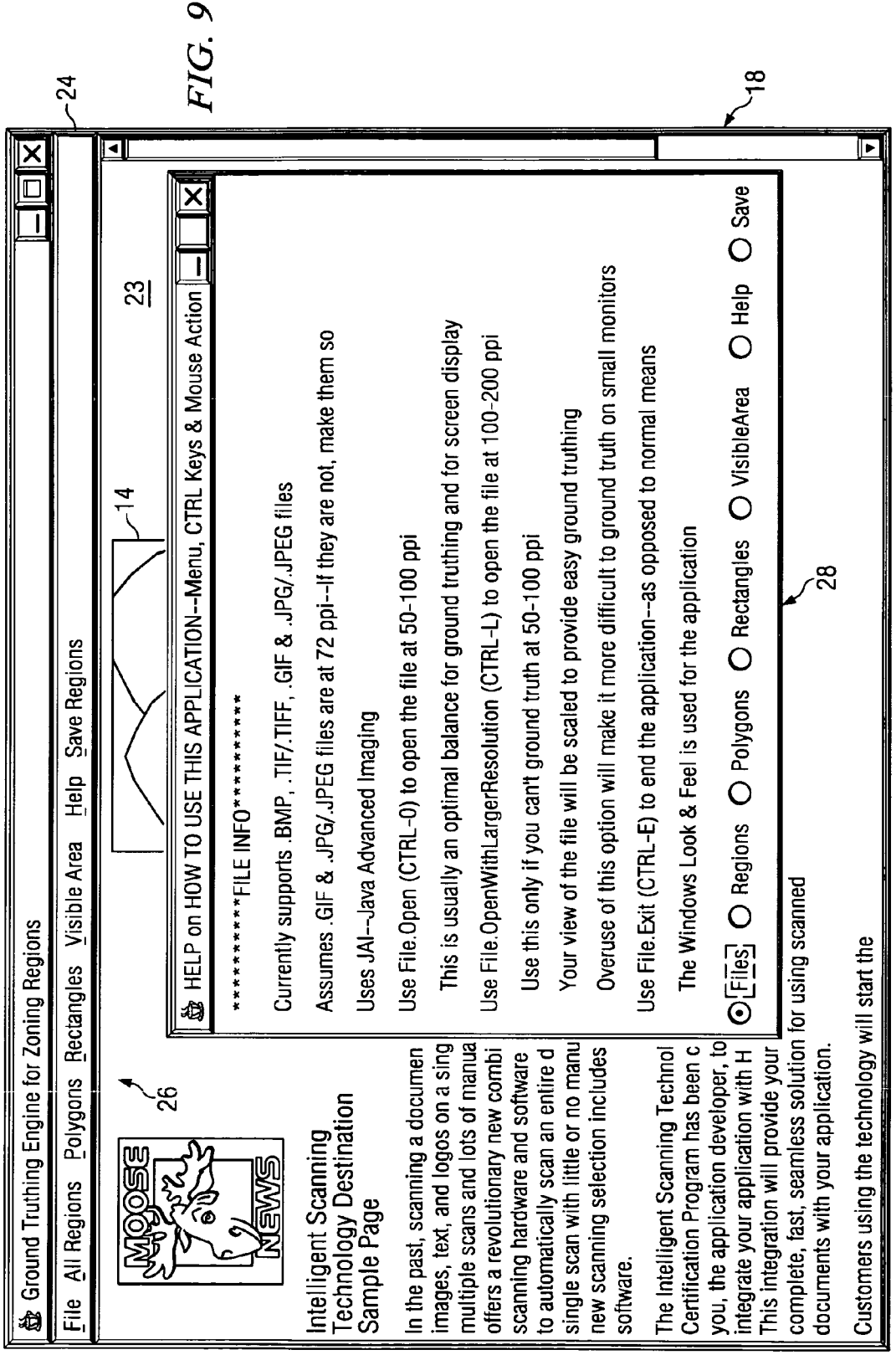
FIG. 9 is an exemplary image document that may be processed by method of specifying image layout definition.

FIG. 2 is a flowchart of an embodiment of a method 20 of specifying image layout definition or ground truthing according to the present invention. In blocks 22 and 23, a source of an image document 14 such as a stored file, a video frame, the output from a scanner, is opened and displayed, respectively. Optionally, the user may specify to resize the image file and/or to display the image file so that the entire image is shown in the available display screen. Details on these processes are described below and shown in FIGS. 6 and 7. As shown in FIG. 9, the image file is displayed in a graphical window 23 in graphical user interface 18. Graphical user interface 18 may include a menu bar 24 comprising a plurality of menu selections 26. FIG. 9 further shows a help pop-up window 28 that contains text describing the functionalities associated with the file menu selection. Returning to the flowchart in FIG. 2, the user may instruct system 10 to generate region definitions by inputting the region boundaries or vertices (block 30), by a region click-and-select process (block 32), or by an automatic region analysis process (block 34).

Region click-and-select process shown in block 32 enables a user to use a pointing device to indicate on the graphical user interface the location of points within regions of interest for classification and segmentation. For example, if the user clicks on a point on the image document displayed on the graphical user interface, the region containing the identified point is analyzed and the boundaries of the region are derived. The data type of the region containing the identified point is also determined. Therefore, the user may define the regions of the image document by successively clicking on a point within each region.

Automatic region analysis process shown in block 34 is a process that performs zoning analysis on the image document to form all of its regions using a segmentation process, and determine the region characteristics using a classification process. Various techniques are well-known in the art for performing segmentation analysis, which fall into three broad categories: top-down strategy (model-driven), bottom-up strategy (data-driven),and a hybrid of these two strategies. Examples of these strategies are described in Theo Pavlidis and Jiangying Zhou, *Page segmentation and Classification*, published in *Document Image Analysis*, pp 226-238, 1996, and Anil K. Jain and Bin Yu, *Documentation Representation and Its Application to Page Decomposition*, published in *Pattern Analysis and Machine Intelligence*, pp 294-308, Vol. 20, No. 3, March 1998. Various techniques are well-known in the art for performing classification analysis, which are also described in the above references. Further, a suitable automatic zoning analysis process is implemented in the PrecisionScan software used in the image capture devices such as the ScanJet 5300C manufactured by Hewlett-Packard Company of Palo Alto, Calif.

Process 20 further provides a third method of defining the regions in the image document, as shown in block 30. The process in block 30 enables the user to define a polygonal region, a rectangular region, and a visible area in the image document. This process is described in more detail below with reference to FIGS. 3-5.

In block 36, the defined regions in document 14 are displayed in graphical user interface 18 and an example of which is shown in FIG. 10. As shown in FIG. 10, the boundaries of each region is outlined by color-coded lines (indicated by different lines in the figure). For example, a text region (regions 50-56) may be outlined in green, a color graphic region (regions 57) may be outlined in purple, a black and white graphic region (region 58) may be outlined in blue, a photographic region (region 59) may be outlined in yellow, etc. Further as shown in block 38, a user may provide or modify the layout definition of selected regions in the document. For example as shown in FIG. 10, the user may select region 59, which is a region containing a photographic element. The user may do so by right-clicking on the selected region, which causes a pop-up submenu 60 to appear over region 59 that displays a number of region layout definitions that the user may modify. For example, the user may change the current region type setting of region 59 from "photo" to another region type. The user may also verify or modify the layout specification by inputting the region modality (such as black and white, gray scale or color), highlighting a specific region, and deleting a region using the same pop-up submenu. The pop-up submenu 60 is displayed in such way to indicate a current setting of the region, such as by highlighting or deactivating the "photo" and "color" selections for the region type and modality settings, respectively. By specifying the modality of a region, the bit-depth of the region is effectively changed. For example, a black-and-white setting may equate to a 1-bit bit-depth, a gray scale setting may equate to a 8-bit bit-depth, and a color setting may equate to a 24-bit bit-depth. Therefore, by giving the user the ability to change the modality and type of each region, the same image document can be modified to be used for another purpose, which is commonly known as re-purposing.

In block 40 of FIG. 2, if desired, the user may also update the boundaries of the defined regions by selecting the region and then drag the outline of the region boundaries to enlarge or contract the region by a process such as "rubberband boxing." The user may also modify or specify the margins of the image document by selecting menu items associated with the visible area function, as shown in block 42. The visible area of an image document defaults to the entire image, but the user may make the visible area smaller than the entire document image. If the visible area specified by the user is too small to fully enclose any one region in the document, it is automatically expanded to include the full boundaries of all the regions in the document. A click-and-drag method can also be used to modify the visible area of the image document. The user can iteratively and selectively perform the above optional functions and save the document layout definitions, as shown in block 44. The process ends in block 46.

FIGS. 3-5 provide additional details on the processes of defining polygonal regions, rectangular regions, and visible areas in the document. FIG. 3 is a flowchart of a polygonal region definition process 70 according to an embodiment of the present invention. Polygonal region definition process 70 provides a user the ability to generate polygonal region outlines around layout elements in the document. Generally, polygonal regions are regions with non-rectangular boundaries or regions with more complex boundaries. To create a polygonal region, the user may select a create polygon function, and then the user may indicate the vertices of the polygon around the document layout element by successive clicks of the pointing device or mouse on the displayed document in graphic user interface 18, as shown in block 72. The displayed image of the document is updated continually on the screen to provide a visual feedback of the resulting lines and vertices of the polygonal region. Process 70 may automatically close the polygonal region, in other words connect the first user-indicated vertex and the last user-indicated vertex, as shown in block 74. The user may indicate the completion of the vertices by selecting an appropriate function or by double-clicking when inputting the last vertex. The polygonal region is thus entered by the user.

At block 76, the boundaries of the generated region are verified to ensure that the enclosed region does not overlap another region in the document and that the boundary lines of the region do not cross each other, for example. A separate and independent region manager 77 may be selected to enforce the adherence to a region enforcement model. For example, one region enforcement model may specify that no regions may have overlapping boundaries, another region enforcement model may specify that a text region may be overlaid over a background region and that the text is contained completely within the background region, or another region enforcement model may specify a permissible ordering of overlapping regions and what type of layout elements those overlapping regions may contain (commonly termed "multiple z-ordering"), etc. If region irregularities have been detected, an pop-up window containing an error message is displayed. Process 70 may automatically delete the irregular region(s) or crop or shift regions so that the enforcement models are followed.

In block 78, the region type and modality and/or other definitions associated with the polygonal region are set to the default values. The default values may be determined a priori by the user or they may be system-wide defaults. A newly-created polygonal region may default to text and black-and-white type and modality values, respectively. These default values can be easily modified by the user to other values, such as described above and shown in FIG. 2. A specification of the polygon region definition is generated, as shown in block 80. However, the generation of the polygonal region definition in a particular format, such as eXtensible Markup Language, may be performed when the entire document layout has been completed. The polygonal region can be saved along with the other document layout definitions of the document, as shown in block 82. The process ends in block 84.

FIG. 4 is a flowchart of a rectangular region definition process 90 according to an embodiment of the present invention. A rectangular region is, by definition, a four-sided area with 90° corners. The user may first select a create a rectangular region function, and then indicate, using the pointing device on the graphical user interface, the first corner of the rectangle, as shown in block 92. A rubberband box is displayed on the graphical user interface which enables the user to drag or move the opposing corner of the rectangular region in blocks 94 and 96. The boundaries of the resulting rectangular region is displayed in block 98. The boundaries of the generated rectangular region is verified by using a region manager to ensure that the resultant regions comply with a region enforcement model 101. For example, the region may not be permitted to overlap another region in the document and that the boundary lines of the region should not cross each other in block 100. Other examples of region enforcement models comprise a specification that no regions may have overlapping boundaries, a specification that a text region may be overlaid over a background region and that the text is contained completely within the background region, or a specification of permissible ordering of overlapping regions and what type of layout elements those overlapping regions may contain (commonly termed "multiple z-ordering"), etc. If region irregularities have been detected, an pop-up window containing an error message is displayed. Process 90 may automatically delete the irregular region(s) or crop or shift regions so that the enforcement models are followed. If such irregularities have been detected, an pop-up window containing an error message is displayed.

The default characteristics of the newly-created rectangular region may be set to the default values of text and black-and-white type and modality values, respectively, as shown in block 102. The newly-created rectangular region definition or the location of the rectangular region is generated and saved, along with other layout definitions of the document, as shown in block 104. The process ends in block 106.

FIG. 5 is a flowchart of a visible area definition process 110 according to an embodiment of the present invention. As described above, the visible area definition specifies the outer boundaries around the edge of the document. In block 112, the user invokes the visible area functionality by selecting the create visible area function and indicates the first corner of the visible area. A rubberband box is then displayed in the graphical user interface to enable the user to manipulate the size (width and length) of the visible area, as shown in block 114. The user then indicates the location of the opposite corner of the visible area using the pointing device, as shown in block 116. The resulting visible area boundaries are displayed, as shown in block 118. The visible area so specified is verified, as shown in block 120. If the visible area boundaries is too small to fully enclose any one region in the document, its boundaries are automatically expanded to enclose the boundaries of all the regions in the document. The visible area definitions are generated and saved along with other document layout element layout definitions, as shown in block 122. The process ends in block 124. The visible area layout specification is particularly important in electronic publication applications as it enables the user to specify the margins on the image, and thus the amount of white space around the boundaries of the page.

An example of a model for the layout definition specification output of process 20 is:

```
<!ELEMENT GroundTruthing (name, version, n_regions, GroundTruthingRegion+, xres,
yres, width, height)>
   <!ELEMENT name (#PCDATA)>
   <!ELEMENT version (#PCDATA)>
   <!ELEMENT n_regions (#PCDATA)>
   <!ELEMENT xres (#PCDATA)>
   <!ELEMENT yres (#PCDATA)>
   <!ELEMENT width (#PCDATA)>
   <!ELEMENT height (#PCDATA)>
   <!ELEMENT VisibleArea (left, right, top, bottom)>
      <!ELEMENT left (#PCDATA)>
      <!ELEMENT right (#PCDATA)>
      <!ELEMENT top (#PCDATA)>
      <!ELEMENT bottom (#PCDATA)>
   <!-- resolutions in ppi, width & height in pixels -->
   <!ELEMENT GroundTruthingRegion (bbox, polygon, region_type,
region_modality)>
      <!ELEMENT region_type (#PCDATA)>
      <!-- region types are TEXT | DRAWING | PHOTO | TABLE | EQUATION-->
      <!ELEMENT region_modality (#PCDATA)>
      <!-- modalities are: BW | GRAY | COLOR -->
      <!-- bbox and polygon values in pixel location for current resolutions -->
      <!ELEMENT bbox (xmin, xmax, ymin, ymax)>
         <!ELEMENT xmin (#PCDATA)>
         <!ELEMENT xmax (#PCDATA)>
         <!ELEMENT ymin (#PCDATA)>
         <!ELEMENT ymax (#PCDATA)>
      <!ELEMENT polygon (n_vertices, vertex+)>
         <!ELEMENT n_vertices (#PCDATA)>
         <!ELEMENT vertex (xcoord, ycoord)>
            <!ELEMENT xcoord (#PCDATA)>
            <!ELEMENT ycoord (#PCDATA)>
```

The above represents a model for the ground truthing metadata produced for each image document. The data is represented as integers (int), floating point (double) and enumerated types or strings. The rectangular boundaries are represented as "xmin," "xmax," "ymin," and "ymax," and the vertices as "vertex(xcoord,ycoord)." The region type and region modality are specified by "region_type" and "region_modality." The notation "#PCDATA" is replaced by actual data obtained by document analysis. An example of a partial layout definition specification of the exemplary image document shown in FIGS. 9 and 10 is shown below:

```
<GroundTruthing>
   <name>Ground Truthing Engine in JAVA</name>
   <version>1.0</version>
   <n_regions>1</n_regions>
   <xres>75</xres>
   <yres>75</yres>
   <width>638</width>
   <height>875</height>
   <VisibleArea>
```

-continued

```
      <left>0</left>
      <right>638</right>
      <top>0</top>
      <bottom>825</bottom>
   </VisibleArea>
   <GroundTruthingRegion>
      <region_type>PHOTO</region_type>
      <region_modality>BW</region_modality>
      <bbox>
         <xmin>329</xmin>
         <xmax>593</xmax>
```

-continued

```
         <ymin>45</ymin>
         <ymax>412</ymax>
      </bbox>
      <polygon>
         <n_vertices>5</n_vertices>
         <vertex>
            <xcoord>329</xcoord>
            <ycoord>412</ycoord>
         </vertex>
         <vertex>
            <xcoord>593</xcoord>
            <ycoord>412</ycoord>
         </vertex>
         <vertex>
            <xcoord>593</xcoord>
            <ycoord>45</ycoord>
         </vertex>
```

-continued

```
        <vertex>
            <xcoord>329</xcoord>
            <ycoord>45</ycoord>
        </vertex>
        <vertex>
            <xcoord>329</xcoord>
            <ycoord>412</ycoord>
        </vertex>
      </polygon>
    </GroundTruthingRegion>
    ...
</GroundTruthing>
```

It may be seen that one specified region is a region containing a photograph layout element that is to be treated as a black-and-white layout element. Its boundaries and vertices have been defined in X and Y coordinates. Further, the visible area boundaries is also defined in terms of left, right, top and bottom margins. The use of a format such as XML for the layout definition yields many advantages. Image documents may be compared with one another, classified and clustered using the layout definition specification. The layout definition specification may also be provided as input to a print-on-demand system that uses the specification to "proof" its layout and to maintain print quality.

There are instances in which a user may desire to specify the size of the image file to limit the amount of memory needed to load the image file or limit the bandwidth needed to transmit the image file over a network to a remote ground truth system. Process 140 enables the user to specify a smaller size (and thus lower resolution) of the image to use for ground truthing, as shown in FIG. 6. In block 142, the user provides the desired image size. For example, the user may specify 1 MB as the desired file size of the image. In block 144, the bit depth or the number of bits used to scan or store data of each pixel of the image is determined. The bit depth information may be extracted from the file header of the image file, for example. The image size is then determined, as shown in block 146. The image size may be stated in terms of the two dimensions, width and height, of the document in inches for example, and may also be extracted from the file header. The X and Y resolution of the image, in response to the user-specified image size are determined, as shown in block 148, by using the following equations:

$$X_{RESOLUTION} * Y_{RESOLUTION} = IMAGE\_SIZE / (BIT\_DEPTH * WIDTH * HEIGHT)$$

With all variables to the right of the equal-to sign known, and if the resolution is the same in the X and the Y axes, the X and Y resolution can be computed. The computed resolution may be used to open the image file as well as to transmit the image file across network links to limit the memory size or bandwidth needed to process the image file. The process ends in block 150.

FIG. 7 is a flowchart of a display image file process 160 according to an embodiment of the invention. Process 160 may be used so that the entire image document is simultaneously displayed on the screen without requiring the user to scroll or manipulate the display to see all the pixels. In block 162, the resolution of the display screen is determined. For example, the display screen resolution may be set to 1024 pixels×768 pixels. The number of pixels occupied by the frame, menu bar, and other layout elements of graphical user interface 18 (FIG. 1) is determined so that the available space to display the image document is computed in block 164. For example, the window frame, tool bars, menu bars and other graphical user interface components may reduce the amount of space available to display the image to 974×668 pixels. The viewed image size is then determined, as shown in block 166. The image size may be stated in terms of the two dimensions, width and height, of the document in inches for example, and may also be extracted from the file header. For example, the viewed image size may be 8.5 inches by 11 inches. The maximum resolution available in the X- and Y-axes for viewing the image on the display screen is then computed, and the smaller resolution of the two is selected as the viewing resolution, as shown in block 168. The process ends in block 170.

In the 1024×768 display screen resolution example above, if the space available to display the image after accounting for the graphical user interface is 978×668 pixels, and the size of the image is 8.5 in.×11 in., then the maximum resolution in the Y-axis is 668/11, which equals to 60.7 pixels per inch (PPI). In the X-axis, the maximum resolution is 974/8.5, which equals to 114.6 pixels per inch. Therefore, 60 pixels per inch is the selected resolution to display the image so that it can be viewed on the screen in its entirety. Because the region boundaries are defined in pixels that are easily scaled up or down in resolution, and that a user can choose integer divisor values of the original resolution to scale the boundaries, region boundary information is maintained without blurring.

Figure 11:
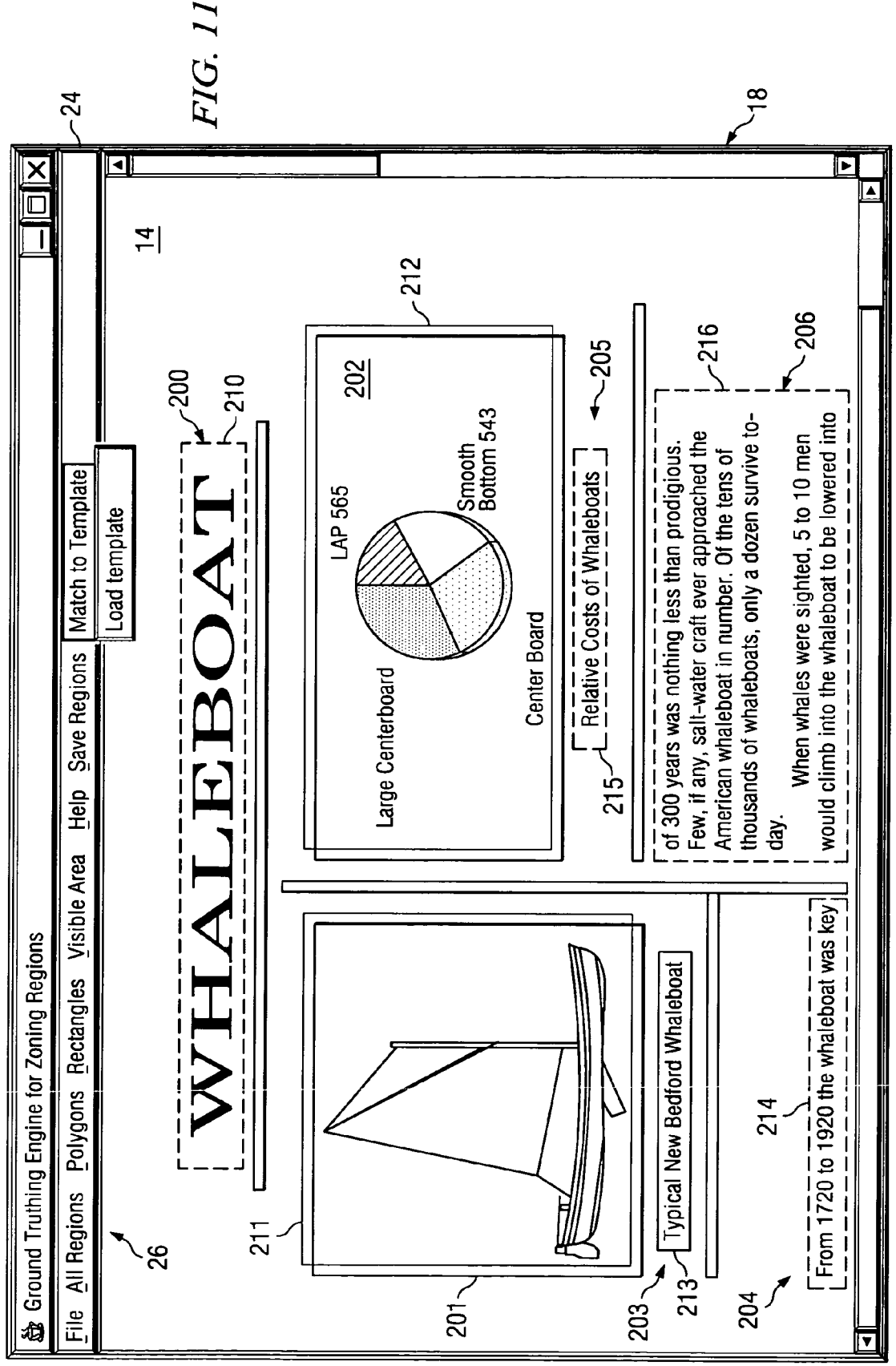
FIG. 11 is an exemplary image document used to illustrate the of a snap-to-template process according to an embodiment of the present

FIG. 8 is a flowchart of a snap-to-template process 180 according to an embodiment of the present invention. snap-to-template process 180 may be used to conform scanned images to a previously defined image document template in template database 19 (FIG. 1), which is accessible by system 10. Referring to FIG. 8, after the image document has been loaded into random memory accessible by system 10, and its layout definitions specified using process 20 shown in FIG. 2 and described above, a search is made in the template database for the closest matching template, as shown in block 182. The search results is displayed to the user on the graphical user interface for the user's approval, as shown in block 184. If the search yields more than one match, then a list of matches is shown to enable the user to select one to be used in block 186. The selected template is then loaded in random memory accessible by system 10 and its regional definitions may be displayed in the graphical user interface, as shown in block 88. As shown in FIG. 11, image document 14 comprises several text and other graphical layout elements 200-206. The best-match template comprises several defined regions 210-216 that specify the location, type, modality and other properties of the defined regions. It may be seen that because of scanning or other processing, the layout elements of image document 14 are shifted slightly as compared with the specifications of the best-match template. In block 190, the image document elements are "snapped" or conformed to the layout definition specified in the template, cropping, scaling and/or de-skewing the layout elements or document as appropriate. Where the relative or absolute location of the layout elements and/or visible area is offset from the region layout in the template, the location of the layout elements are revised. Where the region type or modality does not match that of the template, it is corrected. The modified image document now has layout elements that conform with the defined regions of the template and the modified image document is saved in memory in block 192. The process ends in block 194.

It may be seen that by using process 180, image documents can be standardized in format with very accurate region layout definitions that conform to the standard set forth in a template. The quality of the image documents so processed can be assured so that offset or skewed images can be detected and corrected. Furthermore, the treatment and processing of defined regions may be standardized according to the template.

Forms, templates, specialized scanning adapters, and specific re-purposing applications require a high degree of accuracy in layout definition. Embodiments of the present invention are operable to provide a highly accurate layout definition of an image document which specifies the location of layout elements in the image document, and their respective types and modalities. The present invention is operable to accept user input of region specification as well as using automatic segmentation and classification analysis. The user may input the boundaries of the regions easily by clicking on a region or by defining the boundaries of the region using the graphical user interface. The layout definition output in eXtensible Markup Language format can be easily manipulated, processed, or used by other applications. The layout definition output may also be used as a image document template that can be used to conform subsequent image documents as to the location of the regions and visible areas as well as the region type and modality. The use of a region management models also enables a user to conform the image document regions to the selected model. Further, the present invention enables a user to process a lower-resolution version of the image document to save on memory usage, processing resources and/or transmission bandwidth.

What is claimed is:

1. A method of processing an image, comprising:
receiving a definition of at least one region within an image, the region definition having a location specification of the at least one defined region and a type specification of the at least one defined region;
displaying boundaries of the at least one defined region according to the type specification of the at least one defined region;
receiving a user-specified definition of a visible area of the image, the visible area definition being automatically expanded to fully enclose all defined regions of the image and having a specification of margins around the image; and
generating an image layout definition based on the region definition of the at least one defined region of the image and the user-specified visible area definition of the image.

2. The method, as set forth in claim 1, further comprising displaying the image on a display.

3. The method, as set forth in claim 2, wherein displaying the image on a display comprises:
determining a display resolution setting of a display screen;
determining an amount of display screen space available to display the image;
determining dimensions of the image;
determining a resolution for simultaneously displaying the entire image on the display screen in response to the display resolution setting, the amount of display screen space available, and the dimensions of the image; and
displaying the image on the display screen in response to the determined resolution.

4. The method, as set forth in claim 1, wherein receiving a definition of at least one region within the image further comprises receiving a modality specification.

5. The method, as set forth in claim 1, wherein receiving a definition of at least one region within the image comprises automatically determining the definition of the at least one region within the image by segmentation analysis of the image.

6. The method, as set forth in claim 1, wherein receiving a definition of at least one region within the image comprises automatically determining the definition of the at least one region within the image by classification analysis of the image.

7. The method, as set forth in claim 1, wherein receiving a definition of at least one region within the image comprises:
receiving a user input indicative of a point on the image; and
defining a region encompassing the point using segmentation and classification analyses of the image.

8. The method, as set forth in claim 1, wherein receiving a definition of at least one region within the image comprises:
receiving a user input indicative of boundaries of the region on the image; and
receiving a user input indicative of region type and region modality specifications.

9. The method, as set forth in claim 1, wherein receiving a definition of at least one region within the image comprises:
receiving a user input indicative of vertices of the region on the image; and
receiving a user input indicative of region type and region modality specifications.

10. The method, as set forth in claim 1, wherein receiving a definition of at least one region within the image comprises:
receiving a user input indicative of vertices of a polygonal region on the image; and
receiving a user input indicative of region type and region modality specifications of the polygonal region.

11. The method, as set forth in claim 1, wherein receiving a definition of at least one region within the image comprises:
receiving a user input indicative of a first vertex and a location of a second vertex opposite the first vertex of a rectangular region on the image; and
receiving a user input indicative of region type and region modality specifications of the rectangular region.

12. The method, as set forth in claim 1, wherein receiving a definition of a visible area of the image comprises receiving a user input indicative of a first vertex and a location of a second vertex opposite the first vertex of the visible area on the image.

13. The method, as set forth in claim 2, wherein displaying the image on a display comprises:
receiving a user specification of a file size of the image;
determining a bit depth of the image;
determining dimensions of the image;
determining a display resolution in response to the file size, bit depth, and image dimensions; and
displaying the image on the display according to the determined display resolution.

14. The method, as set forth in claim 1, further comprising:
receiving a user specification of a file size of the image;
determining a bit depth of the image;
determining dimensions of the image;
determining a display resolution in response to the file size, bit depth, and image dimensions; and
transmitting the image having a resolution according to the determined display resolution.

15. The method, as set forth in claim 1, wherein receiving a definition of at least one region within the image comprises receiving a user specification of a location and boundaries of a region within the image.

16. The method, as set forth in claim 15, wherein receiving a definition of at least one region within the image comprises verifying the user-specified region location and region boundaries conform to at least one region management model.

17. The method, as set forth in claim 15, wherein receiving a definition of at least one region within the image comprises receiving user specification of region type and region modality.

18. The method, as set forth in claim 16, wherein verifying the user-specified region location and region boundaries conform to at least one region management model comprises determining whether the user-specified region boundaries overlap with another region.

19. The method, as set forth in claim 16, wherein verifying the user-specified region location and region boundaries conform to at least one region management model comprises determining whether the user-specified region boundaries cross one another.

20. The method, as set forth in claim 16, wherein verifying the user-specified region location and region boundaries conform to at least one region management model comprises determining whether the user-specified region boundaries fall within the visible area.

21. The method, as set forth in claim 16, wherein verifying the user-specified region location and region boundaries conform to at least one region management model comprises determining whether the user-specified region boundaries comply with a predetermined multiple z-order specification.

22. A system for processing an image, comprising:
a graphical user interface operable to display the image, and receive a definition of at least one region within the image, the region definition having a location specification of the at least one defined region and a type specification of the at least one defined region,
the graphical user interface further operable to display boundaries of the at least one defined region according to the type specification of the at least one defined region, the graphical user interface further operable to receive a user-specified definition of a visible area having a specification of margins around the image, the visible area definition being automatically expanded to fully enclose all defined regions of the image; and
a processor generating an image layout definition based on the region definition of the at least one defined region of the image and the user-specified visible area definition of the image.

23. The system, as set forth in claim 22, wherein the processor is operable to automatically determine the definition of the at least one region within the image by segmentation analysis of the image.

24. The system, as set forth in claim 22, wherein the processor is operable to automatically determine the definition of the at least one region within the image by classification analysis of the image.

25. The system, as set forth in claim 22, wherein the graphical user interface is operable to receive a user input indicative of a point on the image, and define a region encompassing the point using segmentation and classification analyses of the image.

26. The system, as set forth in claim 22, wherein the graphical user interface is operable to receive a user input indicative of boundaries of the region on the image, and receive a user input indicative of region type and region modality specifications.

27. The system, as set forth in claim 22, wherein the graphical user interface is operable to receive a user input indicative of vertices of the region on the image, and receive a user input indicative of region type and region modality specifications.

28. The system, as set forth in claim 22, wherein the graphical user interface is operable to receive a user input indicative of vertices of a polygonal region on the image, and receive a user input indicative of region type and region modality specifications of the polygonal region.

29. The system, as set forth in claim 22, wherein the graphical user interface is operable to receive a user input indicative of a first vertex and a location of a second vertex opposite the first vertex of a rectangular region on the image, and receive a user input indicative of region type and region modality specifications of the rectangular region.

30. The system, as set forth in claim 22, wherein the graphical user interface is operable to receive a user input indicative of a first vertex and a location of a second vertex opposite the first vertex of the visible area on the image.

31. The system, as set forth in claim 22, wherein the graphical user interface is operable to receive a user specification of a file size of the image, determine a bit depth of the image, determine dimensions of the image, determine a display resolution in response to the file size, bit depth, and image dimensions, and display the image on a display according to the display resolution.

32. The system, as set forth in claim 22, wherein the processor is operable to receive a user specification of a file size of the image, determine a bit depth of the image, determine dimensions of the image, determine a display resolution in response to the file size, bit depth, and image dimensions, and transmit the image having a resolution according to the determined display resolution.

33. The system, as set forth in claim 22, wherein the processor is operable to determine a display resolution setting of a display screen, determine an amount of display screen space available to display the image, determine dimensions of the image, determine a resolution for simultaneously displaying the entire image on the display screen in response to the display resolution setting, the amount of display screen space available, and the dimensions of the image, and display the image on the display screen in response to the determined resolution.

34. The system, as set forth in claim 22, wherein the processor is operable to receive a user specification of a location and boundaries of a region within the image, and verify the user-specified region location and region boundaries conform to at least one region management model.

35. The system, as set forth in claim 34 wherein the processor is operable to determine whether the user-specified region boundaries overlap with another region.

36. The system, as set forth in claim 34, wherein the processor is operable to determine whether the user-specified region boundaries cross one another.

37. The system, as set forth in claim 34, wherein the processor is operable to determine whether the user-specified region boundaries fall within a visible area defined by a visible area definition.

38. The system, as set forth in claim 34, wherein the processor is operable to determine whether the user-specified region boundaries comply with a predetermined multiple z-order specification.

* * * * *

UNITED STATES PATENT AND TRADEMARK OFFICE
CERTIFICATE OF CORRECTION

PATENT NO. : 7,424,672 B2
APPLICATION NO. : 10/679154
DATED : September 9, 2008
INVENTOR(S) : Steven J. Simske et al.

It is certified that error appears in the above-identified patent and that said Letters Patent is hereby corrected as shown below:

In column 2, line 18, after "to" insert -- an embodiment --.

In column 2, line 20, after "to an" insert -- embodiment of --.

In column 2, line 22, insert -- the system and -- before "method".

In column 2, line 24, insert -- functionalities -- before "of the".

In column 2, line 25, insert -- an embodiment -- before "of the present".

In column 2, line 27, insert -- functionalities -- before "of a".

In column 2, line 28, after "present" insert -- invention. --.

Signed and Sealed this

Eleventh Day of August, 2009

David J. Kappos
*Director of the United States Patent and Trademark Office*